Patented June 19, 1934

1,963,253

UNITED STATES PATENT OFFICE

1,963,253

MANUFACTURE OF ABRASIVE ARTICLES

Frederick A. Upper, Niagara Falls, Ontario, Canada, assignor, by mesne assignments, to Bakelite Corporation, New York, N. Y., a corporation of Delaware No Drawing. Application October 8, 1930, Serial No. 487,373

8 Claims. (Cl. 51—278)

This invention relates, in general, to the manufacture of bonded articles and in particular to the manufacture of articles containing abrasive material and a resinous binder.

It is well known that bonded articles can be made by molding a mixture of granular and resinous materials. According to the usual processes of making these articles, a mixture of granular and resinous materials and a resin solvent or plasticizer is made and placed in a mold. Pressure is applied to compact and form the mass into the desired shape. The resinous binder is cured by heat which is applied in some cases while the molding mixture is under the forming pressure and in other cases after the pressure has been relieved or withdrawn.

The prior methods of manufacturing resin bonded abrasive articles have resulted in the production of satisfactory articles in most cases, but for certain types of articles they have been found to be unsuitable.

The objects of this invention are the production of new and useful bonded articles of the character indicated and improved methods by which the same may be made.

In carrying out my invention I pass a mixture of inert material, such as abrasive granules, and a resinous binder in plastic form between revolving rolls of the types used in effecting mixtures of rubber with compounding ingredients and in calendering such compounds to reduce them to sheets of the desired thickness. By so doing, I secure a thorough mixture of the ingredients and am enabled to produce articles of the desired compactness and thickness.

According to one method I employ in carrying out my invention, I moisten the granular abrasive material with a resin solvent or plasticizer such as bidutyl phthalate, for example, in the ratio of approximately one part by weight of solvent or plasticizer to one hundred parts by weight of granular material. To one hundred parts by weight of this moistened grain I add from six to twenty parts by weight of a finely divided reaction product of glycerol and phthalic anhydride or other suitable polyhydric alcohol polybasic acid resin. I stir the grain and resinous material together and then warm the mixture to approximately 350° F. A steam table has been found satisfactory for warming the mixture, although other means may be employed. When the mixture has been brought to a temperature at which it becomes plastic, further mixing is secured by repeatedly passing the granular material and binder between revolving rolls that have been coated with a thin film of oil, such as linseed oil, and are maintained at substantially 150° F. After passing the mixture between the rolls approximately ten times, or for such a number of times as is required to secure thorough mixing, the distance between the rolls is adjusted to produce a sheet of the material of the desired thickness, and the mixture is passed between them. Articles of the desired area and shape are cut from the sheet by suitable dies.

An alternative method of forming the plastic mix into an article of the desired size and shape comprises placing the mix containing granular material and a synthetic resin in a suitable mold in such quantity that upon its being compacted the resulting article will be of the desired size, and causing a roll to pass over said mix one or more times in order to compact the mix.

Curing of the articles is accomplished by heating them to a temperature of approximately 350° F. and holding them at that temperature for approximately forty-eight hours.

While the above example states that the mixture is warmed and passed between rolls that are warmed, my invention is not so limited because I have found that the required plasticity is obtainable by other means; for example, I have found that resinous materials produced by heating a condensation or polymerization reaction before the solid stage has been reached, can be used in conjunction with condensation products in the solid but fusible state to produce a plastic mass without the use of heat. An example of such a mixture is one containing 89% granular abrasive 8% powdered B stage phenol-formaldehyde resin 3% liquid or A stage phenol-formaldehyde resin.

My process has many advantages over those previously used in the manufacture of synthetic resin bonded articles. One of these advantages is that I am enabled to manufacture wheels of considerably less than one thirty second of an inch in thickness, although the process is also advantageous in making wheels many times this thickness. Heretofore such thin wheels have not been possible because the methods employed were such that neither uniformity of thickness nor uniformity of bond, granular or pore space resulted.

Another advantage secured by my process is the saving in time and labor in the manufacture of the smaller sizes of articles. I roll out a large sheet to the correct thickness and then cut out a large number of wheels from that sheet. The material left after the articles have been cut from the sheet is not wasted but rolled again into a sheet.

Articles manufactured in accordance with my invention are different from those produced by the usual methods. Abrasive wheels made by pressing the mixture in a mold have not had a suitable structure for producing a ground surface with a satisfactory finish. For this reason it has not been possible to use synthetic resin bonded abrasive wheels in a great many operations for which the wheels were otherwise very suitable. Wheels made in accordance with my invention have been found to be suitable for producing the surfaces that could not be produced by wheels made by the previously known processes.

One of the reasons for the suitability of wheels made by my process for the production of polished surfaces resides in the compactness of such wheels. The porosity, expressed in per cent of the total volume of wheels made by my process, is approximately ten per cent less than the porosity of wheels of the same composition but made by the previously known methods.

While I have described my invention in detail, I do not wish to be limited to the specific materials, steps or sequence of steps disclosed, since my invention may be practised within the scope of the appended claims.

What I claim is:

1. The method of manufacturing resin bonded abrasive articles which comprises preparing a plastic mixture of abrasive grains, a synthetic resin and a plasticizing agent, compacting said mixture into a sheet by passing it between a pair of revolving rolls, cutting an article of substantially the desired shape from the sheeted mixture, and heating said article to indurate the bond.

2. The method of manufacturing resin bonded abrasive articles which comprises preparing a plastice mixture comprising abrasive grains and a polyhydric alcohol-polybasic acid resin, placing the mixture in a mold and compacting the mix by moving a revolving roll over the surface of said mix.

3. The step in the process of manufacturing an abrasive article of low porosity which comprises compacting a plastic mixture of abrasive grains and a synthetic resin by means of a revolving roll.

4. Method of manufacturing resin-bonded abrasive articles which comprises preparing a mixture of abrasive grains and a normally solid synthetic resin of the heat-hardenable type and plastic when hot but non-plastic when cold in the proportions of 6 to 20 parts by weight of the resin to 100 parts of abrasive grains, plasticizing the mixture, compacting the mixture while plastic by a revolving roll to shape it into sheet form, and thereafter applying heat to harden the resin.

5. Method according to claim 4 in which the resin is a polyhydric alcohol-polybasic acid reaction product.

6. Bonded abrasive article comprising a composition of abrasive grains and a normally solid synthetic resin of the heat-hardenable type compacted into a sheet form by rolling and the resin hardened by heat.

7. Bonded abrasive article according to claim 6 in which the resin is a polyhydric alcohol-polybasic acid reaction product.

8. Bonded abrasive article according to claim 6 in which the resin is present in from 6 to 20 parts by weight to 100 parts of abrasive grains.

FREDERICK A. UPPER.